United States Patent
Coplestone

(10) Patent No.: US 11,585,471 B2
(45) Date of Patent: *Feb. 21, 2023

(54) SEAL ASSEMBLY

(71) Applicant: Poulton Technologies Limited, Bristol (GB)

(72) Inventor: Rodney Coplestone, Marlborough (GB)

(73) Assignee: POULTON TECHNOLOGIES LIMITED, Marlborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,327

(22) Filed: May 14, 2021

(65) Prior Publication Data
US 2021/0270399 A1  Sep. 2, 2021

Related U.S. Application Data

(63) Continuation of application No. 16/338,018, filed as application No. PCT/GB2017/053088 on Oct. 12, 2017, now Pat. No. 11,015,747.

(51) Int. Cl.
*F16L 19/07* (2006.01)
*F16L 19/075* (2006.01)
(Continued)

(52) U.S. Cl.
CPC ............. *F16L 19/07* (2013.01); *F16L 19/075* (2013.01); *F16L 19/08* (2013.01); *F16L 21/002* (2013.01); *F16L 21/08* (2013.01); *F16L 23/0286* (2013.01)

(58) Field of Classification Search
CPC ......... F16L 19/07; F16L 19/075; F16L 19/08; F16L 21/002; F16L 23/0286; F16J 15/16;
(Continued)

(56) References Cited

U.S. PATENT DOCUMENTS 663,879 A * 12/1900 Gallup
2,699,344 A *  1/1955 Bissell .................... F16L 23/18
285/341
(Continued)

FOREIGN PATENT DOCUMENTS

CN 203348782 12/2013
DE 25 09 590 9/1976
(Continued)

OTHER PUBLICATIONS

English Language Translation of Chinese Office Action dated Jun. 17, 2020 issued in Chinese Patent Application No. 201780067297.5, 9 pp.
(Continued)

*Primary Examiner* — Gilbert Y Lee
(74) *Attorney, Agent, or Firm* — Nixon & Vanderhye P.C.

(57) ABSTRACT

A seal assembly includes a connector body having an open end configured for receiving a free end of a pipe and an adaptor for securing at the free end of the pipe. The adaptor has a first ring, configured to be mounted around the circumference of the free end of a pipe, and a second ring configured to cooperate with the first ring in order to drive the first ring into engagement with an outer surface of the pipe. A mechanical interlock arrangement is configured for driving the adaptor in the direction of the connector body, when the adaptor is secured at the free end of the pipe. The mechanical interlock arrangement is further configured for preventing or limiting axial movement of the pipe relative to the connector body, when the adaptor is secured to the outer surface of the pipe and when the free end of the pipe is in sealing contact with a metal seal surface of the connector body.

19 Claims, 3 Drawing Sheets

(51) Int. Cl.
*F16L 19/08* (2006.01)
*F16L 21/00* (2006.01)
*F16L 21/08* (2006.01)
*F16L 23/028* (2006.01)

(58) Field of Classification Search
CPC .. F16J 15/184; F16J 15/26; F16J 15/28; F16J 15/3268
See application file for complete search history.

(56) References Cited

U.S. PATENT DOCUMENTS

| | | | |
|---|---|---|---|
| 3,284,112 | A | 11/1966 | Martin |
| 5,335,946 | A | 8/1994 | Dent et al. |
| 8,186,685 | B2 | 5/2012 | Martin |
| 8,226,089 | B2 | 7/2012 | Pallini, Jr. |
| 2002/0140184 | A1 | 10/2002 | Janoff |
| 2004/0212192 | A1 | 10/2004 | Williams |
| 2008/0303223 | A1 | 12/2008 | Nijsen |
| 2010/0126736 | A1 | 5/2010 | Ellis |

FOREIGN PATENT DOCUMENTS

| | | |
|---|---|---|
| DE | 25 45 518 | 4/1977 |
| EP | 0 666 446 | 8/1995 |
| EP | 2 492 568 | 8/2012 |
| FR | 2 437 560 | 4/1980 |
| GB | 20535 | 9/1915 |
| GB | 2008220 | 5/1979 |
| GB | 2 200 702 | 8/1988 |
| JP | 2005-325872 | 11/2005 |
| JP | 2015-7445 | 1/2015 |
| WO | WO 98/10212 | 3/1998 |
| WO | WO 01/29469 | 4/2001 |
| WO | WO 02/50469 | 6/2002 |
| WO | WO 2009/023505 | 2/2009 |

OTHER PUBLICATIONS

Great Britain Combined Search and Examination Report dated Mar. 21, 2017 issued in Great Britain Patent Application No. GB1617299. 1, 9 pp.
International Search Report dated Dec. 22, 2017 issued in PCT International Patent Application No. PCT/GB2017/053088, 3 pp.

* cited by examiner

SEAL ASSEMBLY

CROSS-REFERENCES TO RELATED APPLICATIONS

This application is a continuation of U.S. patent application Ser. No. 16/338,018, filed Mar. 29, 2019, pending, which is the U.S. national phase of International Application No. PCT/GB2017/053088 filed Oct. 12, 2017 which designated the U.S. and claims priority to Great Britain Patent Application No. 1617299.1 filed Oct. 12, 2016, the entire contents of each of which are hereby incorporated by reference.

FIELD OF THE INVENTION

The present invention relates to a seal assembly, more particularly, but not exclusively, to a seal assembly for a metal-to-metal seal to be created between a connector and a pipe.

BACKGROUND OF THE INVENTION

There is an ongoing requirement within the oil industry to provide cost-efficient and consistent methods of connecting oil pipes together in a way that minimises the risk of oil leakage.

Typically, flanged joints are used. These have a number of disadvantages. For example, flanged joints are vulnerable and can be compromised by uneven bolt tightening. Moreover, rubber seals are generally used within these joints, and often fail due to thermal degradation, as well as being at significant risk of damage and subsequent failure from bad practice when joints are assembled on site.

Flanged joints also require welding. This is time consuming during assembly, increasing down time for pipe repairs as well as presenting a fire risk. Further, amidst recent proposals for better offshore pipeline regulation and more refined safety rules covering repairs, there is a requirement to employ qualified welders to perform any repairs, which is a considerable added expense. The installation of flange joints also requires very high precision, requiring highly skilled labour for assembly, further increasing the cost of installation, repair and maintenance.

The present invention seeks to overcome or at least mitigate/alleviate one or more problems associated with the prior art.

SUMMARY OF THE INVENTION

A first aspect of the invention provides a seal assembly. The seal assembly comprises a connector body having an open end configured for receiving a free end of a pipe. An adaptor is provided for securing adjacent the free end of the pipe (e.g. to an outer surface of the pipe, at a location adjacent the free end of the pipe). A mechanical interlock arrangement is provided, wherein the mechanical interlock is configured for driving the adaptor in the direction of the connector body, e.g. when the adaptor is secured to the outer surface of the pipe. The connector body includes a seal surface, and the mechanical interlock is configured for driving the free end of the pipe against the seal surface of the body, e.g. when the adaptor is secured to the outer surface of the pipe, in order to create a seal between the free end of the pipe and said seal surface of the connector body. The mechanical interlock arrangement is further configured for preventing or limiting axial movement of the pipe relative to the connector body, when the free end of the pipe is in sealing contact with said seal surface of the connector body.

In exemplary embodiments, the free end of the pipe comprised a metal surface and said seal surface of the connector body comprises a metal surface, such that a metal-to-metal seal is created between the free end of the pipe and the connector body.

The configuration of the seal assembly allows for the creation of a seal with a pipe without the requirement for traditional pipe flanges. It follows that no welding step is required, which advantageously reduces the risk of fires occurring and removes the need to employ qualified welders. The seal assembly allows a reliable, high-quality metal-to-metal seal is established between the connector body and the pipe. This advantageously removes the requirement for rubber seals, which are susceptible to thermal degradation and mechanical damage in use.

The configuration of the seal assembly also allows for a pipe and connector body to be connected in sealing engagement quickly and easily. Should separation of the pipe and connector body be required, for example to allow the apparatus to be cleaned or moved, or the replacement of worn or damaged components, the assembly can be quickly and easily detached. This would not be possible if a flanged connection were utilised. These features are distinctly advantageous should the assembly be utilised within the oil and gas industry, wherein rapid set-up and removal of drilling and oil and gas transport equipment can offer savings in both time and money to an operator, which is of distinct commercial advantage.

In exemplary embodiments, the metal-to-metal seal is established through the straightforward movement of the adaptor towards the connector body. As a result, the assembly can advantageously be quickly and easily connected to a pipe, to rapidly establish a reliable seal therebetween without the need for supplementary components, further demanding processing steps such as welding or complex tooling.

In exemplary embodiments, the connector body comprises a bore, and wherein the seal surface is part of a side wall of the bore. Such a configuration permits the creation of a seal with a specifically defined point on the outer surface of the free end of each pipe (e.g. an outer surface or an axial end surface at the very end of the pipe). Moreover, the seal is self-creating upon the free end of a pipe being driven against the seal surface of the connector body, meaning that, advantageously, a reliable and high-quality seal is quickly achievable.

In exemplary embodiments, the bore of the connector body defines a fluid flow path for fluid travelling from the pipe into the connector body. In exemplary embodiments, the seal surface extends from the open end of the connector body to a location within the connector body, so that a seal can be created adjacent the open end of the connector body.

In exemplary embodiments, the diameter of the bore decreases away from the open end of the connector body. Providing a bore of progressively decreasing diameter advantageously ensures that the metal-to-metal seal is created as the free end of a pipe is inserted within the open end of the connector body, and then simply moved in the direction of the connector body.

In exemplary embodiments, the bore has a central longitudinal axis and is defined by a circumferential side wall, and wherein a portion of the side wall extends away from the open end of the connector body at an angle of less than 10° with respect to the central longitudinal axis.

In exemplary embodiments, the portion of the side wall extends at an angle of substantially 4° with respect to the central longitudinal axis.

It has been found that tapering a portion of the side wall of the bore of the connector body at an angle of less than 10° with respect to the central longitudinal axis, advantageously allows a metal-to-metal seal to be created between the free end of a pipe and the side wall of the bore of the connector, as the free end of the pipe is inserted within the free end of the connector body, without unduly limiting the volume of the bore available for the transmission of a fluid through the connector body.

In exemplary embodiments, the adaptor comprises a first ring, configured to be mounted around the circumference of the free end of a pipe, and a second ring configured to cooperate with the first ring in order to drive the first ring into engagement with an outer surface of the pipe when the adaptor is driven in the direction of the connector body by the mechanical interlock arrangement.

In exemplary embodiments, the first ring has an angled outer surface defining a first taper, and the second ring has an angled inner surface defining a second taper complimentary to said first taper, wherein contact forces acting therebetween increase upon axial movement of the second ring relative to the first ring in the direction towards the connector body, for driving the first ring in a radial direction into contact with the outer surface of a pipe.

Advantageously, the first ring and the second ring are configured such that straightforward relative movement therebetween, as a result of the second ring being moved in the direction of the connector body is sufficient to secure the first ring with respect to the outer surface of a pipe, and to create a metal-to-metal seal between the connector body and the free end of the pipe. As a result, such a configuration may provide an operator with savings in both time and money when setting up, and dismantling the sealing assembly.

In exemplary embodiments, the first ring has a first end, a second end and a central longitudinal axis, and wherein the angled outer surface extends between the first and second ends at an angle of between 5 and 15° with respect to the central longitudinal axis.

In exemplary embodiments, the angled outer surface extends at an angle of substantially 8° to the central longitudinal axis.

It has been found that tapering the angled outer surface of the first ring at an angle of between 5° and 15° with respect to the central longitudinal axis, advantageously allows a minimum level of relative movement between the first ring and the second ring to result in a maximum increase in contact stresses acting therebetween. Advantageously, this means an operator only has to move the second ring a small distance, in order to achieve ensure that the first ring is securely attached to the outer surface of a pipe.

In exemplary embodiments, the first end of the first ring comprises a first radial stop surface, arranged for abutment by the second ring, to limit movement of the second ring in the direction towards the connector body.

The provision of such a radial stop limits the extent to which the second ring may be moved relative to the first ring, in the direction towards the connector body. Advantageously, this ensures that the second ring is prevented from overriding the first ring when the seal assembly is connected to the free end of a pipe, thus reducing the likelihood of damage to the assembly and the metal-to-metal seal being compromised.

In exemplary embodiments, the connector body includes a first recess, and wherein the first end of the first ring is configured to nest within said recess when the second ring is driven in the direction of the connector body.

The dimensions of the first end of the first ring and the recess are configured such that the first end of the first ring may nest within the recess. This ensures that the concentricity of the first ring, the second ring, the connector body and an inserted pipe is maintained. Advantageously, this ensures that a reliable seal is maintained between the connector body and the inserted pipe even when the pipe may be subject to externally acting forces, such as a bending moment.

In exemplary embodiments, the first end of the first ring comprises a tapered outer surface configured to cooperate with a side wall of the first recess, to assist the passage of the first end of the first ring into the first recess.

In exemplary embodiments, the first recess is configured to be arranged adjacent the outer surface of a pipe, when said pipe is inserted into the open end of the connector body.

In exemplary embodiments, the connector body has a substantially cylindrical form defined by a circumferential side wall, wherein said side wall has an end face having a stepped profile which defines the first recess, and wherein an innermost wall of the first recess is adjacent the bore of the connector body.

It has been found that the point at which the first ring engages with the connector body, when the adaptor is secured with respect to the connector body, may act as a pivot point when externally acting forces, such as bending moments, act on a connected pipe. It has also been found that minimising the radial distance of this point from the pipe can greatly reduce the impact of said external forces on the integrity of the metal-to-metal seal between the free end of the pipe and the connector body. As a result, the likelihood of fluid leakage is greatly reduced.

In exemplary embodiments, the first recess comprises an opening, and wherein the width of the opening is less than 50% of the radial width of the circumferential side wall.

In exemplary embodiments, the width of the opening is substantially 30% of the radial width of the circumferential side wall.

The dimensions of the recess are configured such that the point at which an attached pipe may pivot with respect to the connector body, should external forces such as bending moments act on said pipe, is located as closely to the pipe as possible. Advantageously, this greatly reduces the likelihood that the metal-to-metal seal between the connector body and the attached pipe will be compromised as a result of said forces, and that fluid leakage may result. In addition, such dimensions allow for the radial width of the connector body to be maximised, i.e. formation of the recess does not require the removal of material to an extent that may compromise the structural or mechanical integrity of the connector body.

In exemplary embodiments, the innermost wall of the first recess defines a radial stop surface arranged to engage a second radial stop surface provided on the first end of the first ring, and wherein abutment of the second radial stop surface with the innermost wall of the first recess prevents further movement of the adaptor in the direction towards the connector body.

The provision of such a radial stop limits the extent to which the first ring may move towards the connector body, and as such advantageously provides for continued movement of the second ring towards the connector body when the stop surfaces are in abutment to serve to increase the security of engagement between the first ring and the pipe.

In exemplary embodiments, an inner surface of the first ring is non-planar, and is configured to securely engage with the outer surface of a pipe.

The inner surface of the first ring is configured such that upon engagement with the outer surface of a pipe, and upon movement of the second ring with respect to the first ring in the direction towards the connector body, the first ring may securely grip the outer surface of the pipe. As a result, the likelihood of undesired relative movement between the first ring and the pipe is advantageously reduced, and the free end of a pipe may be more reliably driven into the open end of the connector body upon further movement of the second ring with respect to the first ring, to create a metal-to-metal seal between the free end of the pipe and the connector body.

In exemplary embodiments, the non-planar profile of the inner surface of the first ring is configured to engage the outer surface of a pipe by virtue of an interference fit.

Configuring the inner surface of the first ring such that engagement with the outer surface of a pipe is by virtue of an interference fit, provides an advantageously low-complexity arrangement wherein no further supplementary components are required to ensure a secure engagement between the first ring and a pipe.

In exemplary embodiments, the first ring includes a keying surface configured for purchase into the outer surface of a pipe.

Advantageously, such an arrangement means that no modification of the outer surface of the pipe is required to ensure that the first ring may securely engage with the outer surface of a pipe.

In exemplary embodiments, the inner surface of the first ring comprises a profile configured to complement a non-planar profile of the outer surface of a pipe.

In exemplary embodiments, the inner surface of the first ring comprises a plurality of projections (e.g. teeth or barbs), configured to be received in a series of recesses on the outer surface of a pipe.

By providing the inner surface of the first ring with a profile, such as a series of projections, that complements the profile of the outer surface of a pipe (i.e. a series of recesses), the first ring may engage more securely with the outer surface of said pipe.

Advantageously, this provides for the pipe being driven more reliably into the open end of the connector body, which in turn provides for a reliable, high quality metal-to-metal seal being created between the pipe and connector body.

In exemplary embodiments, the assembly further comprises a locating arrangement for ensuring a desired alignment of the mechanical interlock arrangement with the connector body, as the adaptor is moved in the direction towards the connector body.

The provision of a locating arrangement further ensures that the concentricity of the first ring, the second ring, the connector body and each inserted pipe is maintained. Advantageously, this ensures that a reliable seal is maintained between the connector body and the inserted pipe even when the pipe may be subject to externally acting forces, such as a bending moment.

In exemplary embodiments, the locating arrangement comprises an end face of the connector body having a second recess, and an end face of the adaptor having a projection configured to be received within said recess during movement of the adaptor in the direction towards the connector body.

Such an arrangement requires no additional, supplementary components to maintain the position of the adaptor with respect to the connector body. The apparatus is therefore of advantageously low-complexity, meaning that the process of manufacturing the seal assembly can be simplified, and the likelihood that components of the assembly will be dropped and potentially lost during attachment and detachment of the assembly is also reduced.

In exemplary embodiments, the locating arrangement comprises the end face of the connector body having a plurality of recesses, and the end face of the adaptor having a plurality of projections configured to be received within said recesses.

The provision of a plurality of recesses and a plurality of projections ensures that the concentricity of the first ring, the second ring, the connector body and the inserted pipe is maintained as accurately as possible. Advantageously, this further ensures that a reliable metal-to-metal seal is maintained between the connector body and the inserted pipe even when the pipe may be subject to externally acting forces, such as a bending moment.

In exemplary embodiments, the projections comprise a series of castellations, wherein said castellations project at regular intervals around the circumference of the end face of the adaptor, preferably wherein said castellations are arcuate.

Advantageously, distributing the projections at regular intervals around the circumference of the end face of the second ring ensures that should an external force, such as a bending moment, act on a pipe inserted into the connector body, the load is more evenly distributed around the interface between the second ring and the connector body. The even distribution of said force therefore greatly reduces the likelihood that the concentricity of the first ring, the second ring, the connector body and the inserted pipe relative to one another will be lost, and as such, greatly reduces any negative impact on the integrity of the metal-to-metal seal between the connector body and the free end of the pipe.

In addition, it has been found that by providing said castellations, such a configuration further distributes said externally acting force more evenly across each projection. Advantageously, the likelihood that any one projection may fail and break away from the second ring under the action of such a force, is greatly reduced.

In exemplary embodiments, the mechanical interlock arrangement comprises a fastening arrangement for pulling the connector body in the direction of the adaptor, in order to drive the internal surface of the connector body into sealing engagement with the free end of the pipe and to drive the free end of a pipe into the open end of the connector body.

The provision of a fastening arrangement means that the adaptor can be secured in place with respect to the connector body, when the second ring is moved fully in the direction of the connector body. Therefore, advantageously, the metal-to-metal seal between the free end of the pipe and the connector body can be easily and reliably maintained once created, with relative movement between each connected pipe and the connector body minimised.

In exemplary embodiments, the fastening arrangement comprises the adaptor having a plurality of fasteners, and the connector body having a plurality of fastening points configured to receive said fasteners, and wherein the fastening arrangement is configured to releasably attach the adaptor to the connector body.

By providing the second ring with a plurality of fasteners, and the connector body with a plurality of fastening points configured to receive said fasteners, the second ring can be advantageously quickly and easily attached to the connector body upon the adaptor having been moved fully in the direction of the connector body, such that a metal-to-metal seal exists between the connector body and the free end of an inserted pipe. In addition, the second ring can be quickly and easily detached from the connector body by virtue of said attachment being releasable, should an operator wish to remove the seal assembly.

In exemplary embodiments, the adaptor has a plurality of apertures extending therethrough, and wherein the fasteners are configured to be inserted through said apertures in the direction towards the connector body.

In exemplary embodiments, the fastening points comprises a plurality of recesses, configured to align with the fasteners and to releasably attach to said fasteners during movement of the adaptor in the direction towards the connector body.

In exemplary embodiments, the fasteners are bolts, and wherein the fastening points are threaded holes having a corresponding thread to that of each bolt.

Advantageously, a low-complexity arrangement is provided for attaching the second ring to the connector body. Such low-complexity ensures that the seal assembly can be quickly and easily attached, and secured by an operator in a potentially time-critical situation, without the requirement for complex tooling. Further, the costs associated with manufacturing the fastening arrangement, and as such the seal assembly as a whole, can be reduced.

In exemplary embodiments, the fasteners are arranged at regular intervals around the circumference of the adaptor, and wherein the fastening points are located at regular intervals around the end face of the connector body, and wherein the position of each fastener is complementary to the position of each fastening point.

Advantageously, distributing the fasteners at regular intervals around the circumference of the end face of the second ring ensures that should an external force, such as a bending moment, act on a pipe inserted into the connector body, the load is more evenly distributed around the interface between the second ring and the connector body. The even distribution of said force therefore greatly reduces the likelihood that the second ring may become detached from the connector body, or that concentricity of the first ring, the second ring, the connector body and the inserted pipe relative to one another will be detrimentally affected. Such a configuration therefore greatly reduces any negative impact of such an external force on the integrity of the metal-to-metal seal between the connector body and the free end of each pipe.

In exemplary embodiments, the position of each fastener alternates with the position of each castellation around the circumference of the adaptor.

Advantageously, distributing the fasteners and projections at regular, alternating intervals around the circumference of the end face of the second ring maximises the stability of the interface between the second ring and the connector body, and optimises the distribution of load should an external force, such as a bending moment, act on a pipe inserted into the connector body.

In exemplary embodiments, the connector body comprises substantially identical first and second open ends configured for receiving the free ends of first and second pipes, respectively, and wherein the seal assembly further comprises; first and second adaptors, one for securing around the free end of a respective one of said first and second pipes;

and first and second mechanical interlock arrangements, configured for driving a respective one of each of said first and second adaptors in the direction of the connector body to create a metal-to-metal seal between each of said first and second pipes and the connector body, and configured for preventing or limiting axial movement of each of said first and second pipes relative to the connector body.

The configuration of the seal assembly allows two pipes to be connected in sealing engagement, without the requirement for traditional pipe flanges. It follows that no welding step is required, which advantageously reduces the risk of fires occurring and removes the need to employ qualified welders. The seal assembly allows a reliable, high-quality metal-to-metal seal is established between the connector body and each pipe. This advantageously removes the requirement for rubber seals, which are susceptible to thermal degradation and mechanical damage in use.

The configuration of the seal assembly also allows for two pipes to be connected in sealing engagement quickly and easily. Should separation of the pipes and connector body be required, for example to allow the apparatus to be cleaned or moved, or the replacement of worn or damaged components, the assembly can be quickly and easily detached. This would not be possible if a flanged connection were utilised. These features are distinctly advantageous should the assembly be utilised within the oil and gas industry, wherein rapid set-up and removal of drilling and oil and gas transport equipment can offer savings in both time and money to an operator, which is of distinct commercial advantage.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
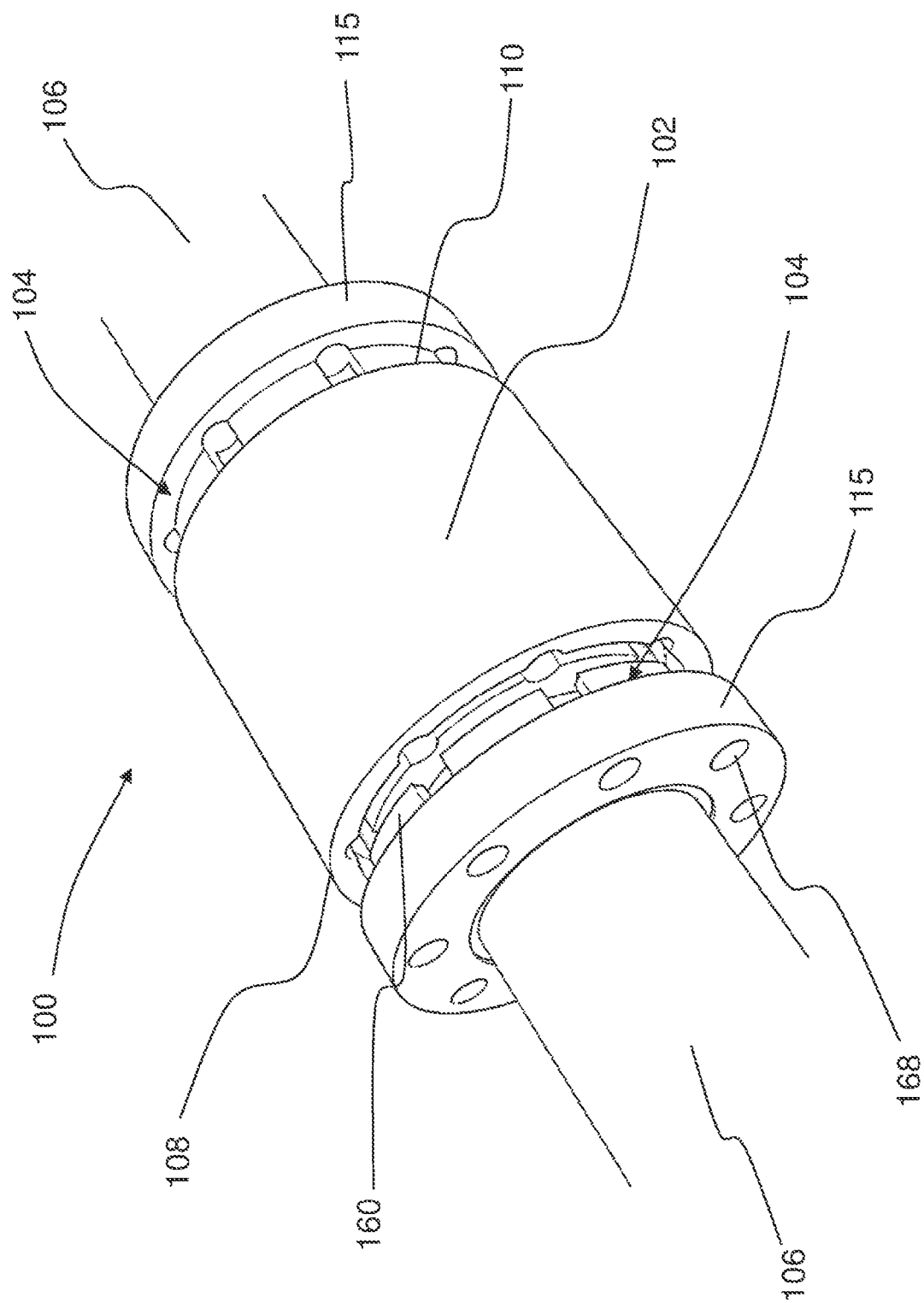
FIG. 1 is a perspective view of a seal assembly according to an embodiment of the invention.

Referring firstly to FIG. 1, a seal assembly for a pipe is indicated generally at 100.

The seal assembly includes; a connector body 102, an adaptor 115 and a mechanical interlock arrangement 104. The mechanical interlock arrangement 104 is configured for cooperation between the adaptor 115 and the connector body 102 such that the adaptor 115 may be driven in the direction of the connector body 102, to create a metal-to-metal seal between a pipe 106 and the connector body 102.

The mechanical interlock arrangement 104 is also configured for securing the adaptor 115 with respect to the connector body 102 to prevent or substantially limiting axial movement of the connector body 102 relative to the free end of the pipe 106, once said pipe 106 has been inserted into the connector body 102. To allow this, the mechanical interlock arrangement 104 is movable between an unsecured condition (illustrated in FIG. 2), in which the pipe 106 has been inserted into the connector body 102 but may still be easily removed, and a secured condition (illustrated in FIG. 3), in which the position of the pipe 106 is securely fixed with respect to the connector body 102, and cannot be removed without the mechanical interlock arrangement 104 being moved back into the unsecured condition.

Figure 2:
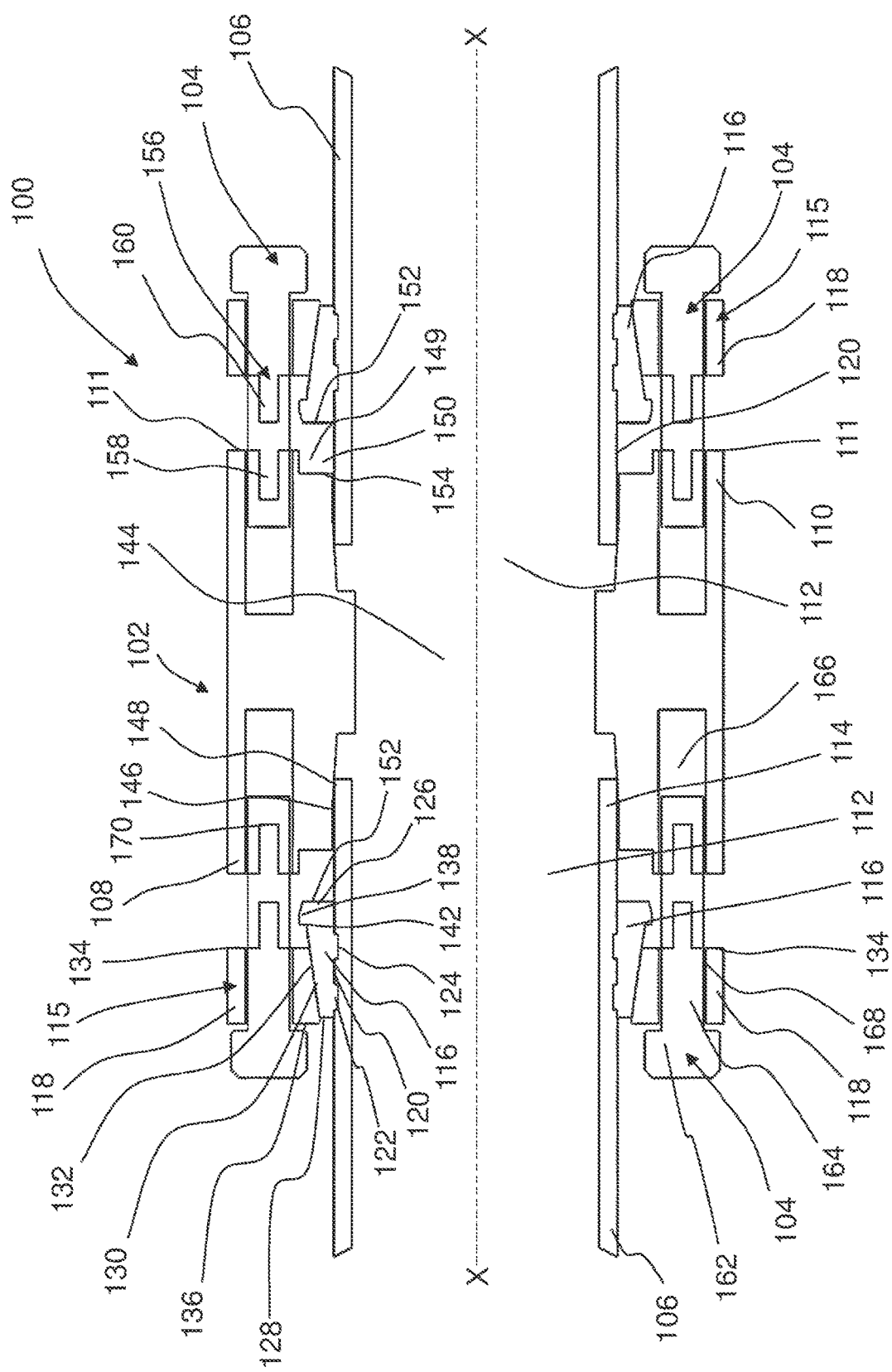
FIG. 2 is a cross sectional view of the seal assembly of FIG. 1, wherein the seal assembly is shown in an unsecured condition.

Referring now to FIG. 2, wherein the seal assembly 100 is shown in an unsecured condition, the connector body 102 has a substantially cylindrical form, having first and second ends 108, 110 which are substantially identical, mirror images of one another. Each of the first and second ends 108, 110 of the connector body 102 has an opening 112, each of which are configured to receive the free end 114 of a pipe 106. Each of the first and second ends 108, 110 of the connector body 102 is configured to engage with a substantially identical adaptor 115 and mechanical interlock arrangement 104. For reasons of conciseness, the seal assembly 100 will now be described further with reference to a single adaptor 115 and mechanical interlock arrangement, which may be located at either the first 108 or second 110 end of the connector body 102.

In the described embodiment, the adaptor 115 includes a first ring, 116, and a second ring 118. The first ring 116 is configured to be mounted around the circumference of the free end of a pipe 106, and defines an aperture with a diameter closely matched to the outer diameter of the desired pipe to be coupled. In the described embodiment, the first ring 116 is a split ring. The provision of a split ring ensures that the pipe 106 may be initially inserted into the aperture, but that once inserted, the first ring 116 will be engaged in close contact with the outer surface 120 of the pipe 106.

An inner surface 120 of the first 116 ring is non-planar, and is configured to securely engage with the outer surface of a pipe 106. This configuration allows the first ring 116 to securely grip the outer surface of the pipe 106 and as a result, the likelihood of undesired relative movement between the first ring 116 and the pipe 106 is advantageously reduced. In the described embodiment, the non-planar profile of the inner surface 120 of the first ring 116 includes a series of circumferential ridges 122, configured to engage with corresponding channels 124 formed around the outer circumference of the outer surface of the pipe 106 by virtue of an interference fit. In alternative embodiments, the inner surface 120 of the first ring 116 and the outer surface of the pipe may have alternative, complementary profiles, or the inner surface 120 of the first ring 116 may include a keying surface configured for purchase into the outer surface of the pipe 106.

Referring again to FIG. 2, the first ring 116 has a first end 126 and a second end 128, with an angled outer surface 130 extending therebetween. The angled outer surface 130 is configured to slidably engage with an angled inner surface 132 that extends between a first end 134 and a second end 136 of the second ring 118. The first ring 116 and the second ring 118 share a central longitudinal axis, indicated by X-X in FIGS. 2 and 3.

The angled outer surface 130 of the first ring 116, and the angled inner surface 132 of the second ring 118 each extend at an angle of substantially 8° with respect to the central longitudinal axis. When the second ring 118 is moved relative to the first ring 116 such that the angled inner surface 132 the second ring 118 slides over the angled outer surface 130 of the first ring 116, contact stresses arising therebetween increase greatly, which acts to drive the first ring 116 into engagement with the outer surface of the pipe 106.

Tapering the angled outer surface 130 of the first ring 116 and the angled inner surface 132 of the second ring 118 at an angle of substantially 8° with respect to the central longitudinal axis, advantageously allows a minimum level of relative movement between the first ring 116 and the second ring 118 to result in a maximum increase in contact stresses acting therebetween. Advantageously, this means an operator only has to move the second ring 118 a small distance in order to ensure that the first ring 116 is securely attached to the outer surface of the pipe 106. In alternative embodiments, the angled outer surface may extend at an angle of between 5° and 15° with respect to the central longitudinal axis.

The first end 126 of the first ring 116 has a collar 138, an outwardly facing surface 140 of which defines the maximum diameter of the first ring 116. The collar 138 has a first radial stop surface 142, arranged to substantially face the first end 134 of the second ring 118. The radial stop surface 142 is configured to abut the first end 134 of the second ring 118, and therefore limit the maximum extent to which the second ring 118 can be moved relative to the first ring 116 in a direction towards the connector body 102, and into the secured position.

The first ring 116 and the second ring 118 are therefore configured to cooperate when the second ring 118 is moved relative to the first ring 116 in the direction of the connector body 102, such that the first ring 116 is driven into engagement with the outer surface of the pipe 106, whilst at the same time, the radial stop surface 142 prevents the second ring 118 from overriding the first ring when the seal assembly 100 is connected to the free end 114 of a pipe 106, thus reducing the likelihood of damage to the seal assembly 100 and the metal-to-metal seal being compromised. In addition, this configuration prevents the second ring from overriding the first ring when the sealing assembly is attached to a first and a second pipes in fluid communication, and said first and second pipes are subject to external stresses such as bending moments, which helps to ensure the structural integrity of the connection and in turn maintain the integrity of the metal-to-metal seal.

The adaptor 115 is configured such that as the second ring 118 is moved towards the connector body 102, whilst the angled outer surface 130 of the first ring 116 is in contact with the angled inner surface 132 of the second ring 118, the free end of the pipe 106 is driven into the opening 112 of the connector body 102. This allows a metal-to-metal seal to be created between the pipe 106 and the connector body 102 through straightforward relative motion between components of the adaptor 115. As a result, the assembly can advantageously be quickly and easily connected between two pipes, to rapidly establish a reliable seal therebetween without the need for supplementary components, further demanding processing steps such as welding or complex tooling.

The connector body 102 comprises a bore 144 defined by a circumferential side wall 146, extending between the opening 112 at the first end 108 of the connector body 102 and the opening 112 at the second end 110 of the connector body 102. The bore 144 has a central longitudinal axis that is substantially coaxial with the central longitudinal axes of the first ring 116 and the second ring 118, and is also indicated by X-X in FIGS. 2 and 3. The diameter of the bore 144 decreases as the side wall 146 extends between the opening 112 and a mid-point of the connector body 102 (i.e. the diameter of the bore 144 has a maximum value at each opening 112, and a minimum value at the mid-point of the connector body 102). This configuration means that when the pipe 106 is driven into the connector body by as a result of the second ring 118 being moved in the direction of the connector body 102 whilst in contact with the first ring 116, the free end 114 of the pipe 106 is driven into contact with the side wall 146 of the bore 144. More specifically, the outer surface 148 of the free end 114 of the pipe 106 is driven into contact with the side wall 146 of the bore 144. This results in local deformation of the surface 148 of the pipe 106, which in turn forms a metal-to-metal seal between the outer surface 148 of the free end 114 of the pipe 106 and the side wall 146 of the bore 144. The metal-to-metal seal is therefore self-creating upon the free end 114 of the pipe 106 being inserted into the free end of the connector body 102, meaning that advantageously, a reliable and high-quality seal is quickly achievable.

Figure 3:
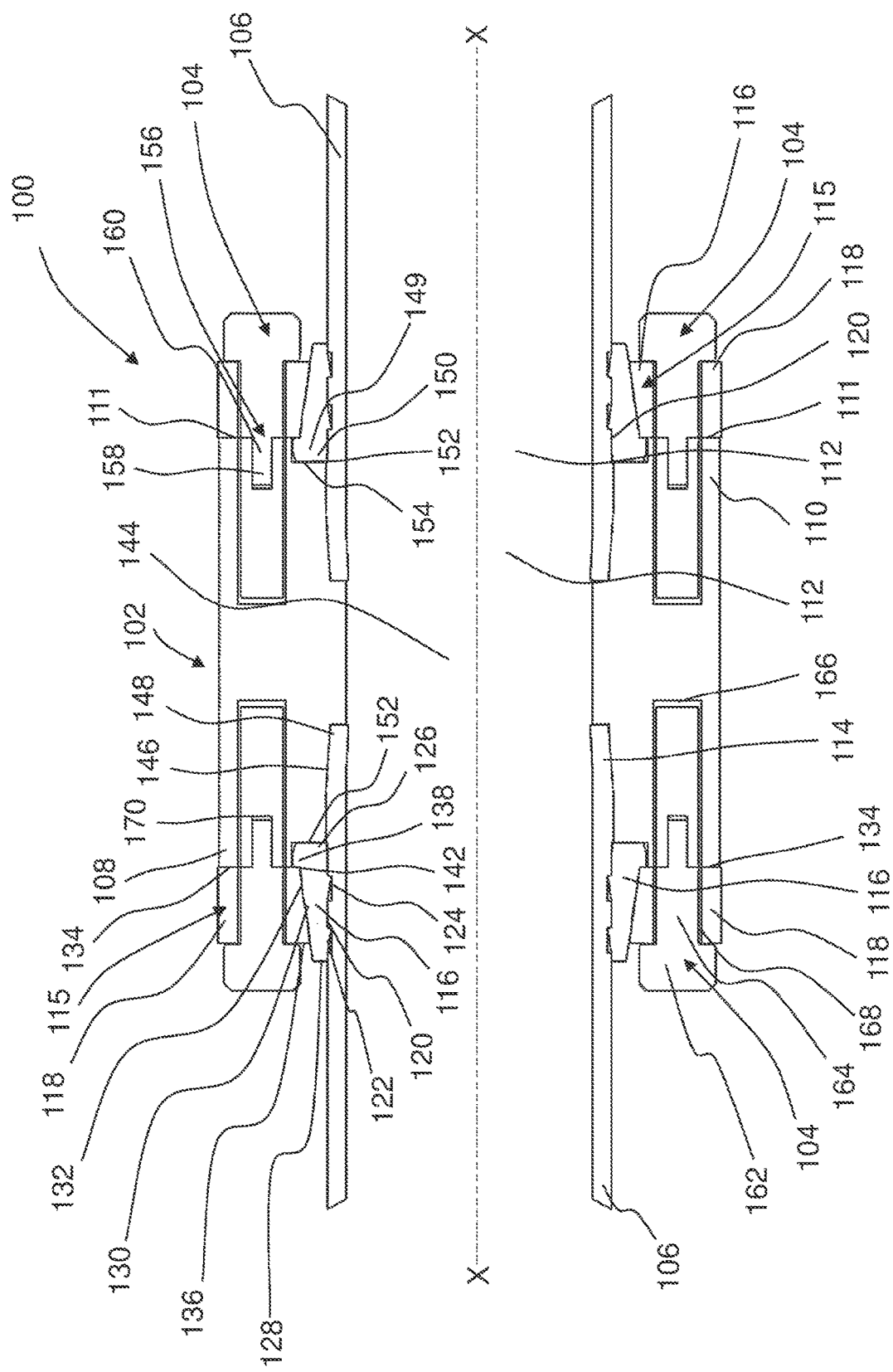
FIG. 3 is a cross sectional view of the seal assembly of FIG. 1, wherein the seal assembly is shown in a secured condition.

Referring now to FIG. 3, in which the seal assembly 100 is shown in a secured condition, in the described embodiment, the minimum diameter of the bore 144 is larger than the diameter of the lumen of each inserted pipe 106. This configuration ensures that there is minimal restriction on the passage of a fluid through the connector body 102. In alternative embodiments, the minimum diameter of the bore 144 may be substantially equal to the diameter of the lumen of each inserted pipe 106. In yet further alternative embodiments, the minimum diameter of the bore 144 may be smaller than the diameter of the lumen of each inserted pipe 106.

The metal-to-metal seal is created close to the flow path of fluid through the connector body 102, between the free ends 114 of each pipe 106. Locating the metal-to-metal seal close to said fluid flow path advantageously ensures that the fluid is transmitted from one pipe to another with penetration into the components of the seal assembly 100.

In the described embodiment, a portion of the side wall 146 extends away from the opening 112 of the connector body 102, at an angle of substantially 4° with respect to the central longitudinal axis. In the described embodiment, the tapered portion of the side wall extends between the opening 112 of the connector body 102 and point substantially at a mid-point of the connector body 102. In alternate embodiments, the tapered portion of the side wall may extend a greater or lesser distance into the connector body 102, in a direction away from the opening 112. Such a configuration has been found to advantageously allow a metal-to-metal seal to be created between the free end 114 of a pipe 106 and the side wall 146 of the bore 144 of the connector body 102, without unduly limiting the volume of the bore 144 available for the transmission of a fluid through the connector body 102. In alternative embodiments, the side wall 146 may taper at any other angle of less than 10° with respect to the central longitudinal axis. In further alternative embodiment, the side wall 146 may taper at an angle of greater than 10° with respect to the central longitudinal axis.

The first and second ends 108, 110 of the connector body 102 each have a radially extending end face 111. Each of said end faces 111 has a first recess 150, configured to receive the collar 138 at the first end 126 of the first ring 116, when the second ring 118 is moved, in contact with the first ring 116, in the direction towards the connector body 102. As the first ring 116 is moved towards the connector body 102, the first end 126 of the first ring 116 is received within the first recess 150 until a second radial stop surface 152, provided at the first end 126 of the first ring 116, abuts a third radial stop surface 154 which defines a base wall of the recess 150.

The first end 126 of the first ring 116 is configured to nest within the first recess 150 when the second radial stop surface 152 is in abutment with the third radial stop surface 154. As can be seen in the illustrated embodiment, the collar 138 may have a tapered outer surface configured to cooperate with a side wall of the first recess, to assist the passage of the first end of the first ring into the first recess.

In the described embodiment, the recess 150 has an opening 149, the radial width of which is substantially 30% of the radial width of the connector body 102. In alternative embodiments, the opening 149 may have a width of another dimension less than 50% of the radial width of the connector body.

Providing the first recess 150 with said dimensions allows for the radial width of the connector body 102 to be maximised as far as possible. This means that in forming the recess, material is not removed from the connector body 102 to an extent that may compromise the structural or mechanical integrity of the connector body 102.

In the described embodiment, the first recess 150 extends continuously around the circumference of an end face 111 at each of the first and second ends 108, 110 of the connector body 102. In alternative embodiments, the first recess 150 may comprise a plurality of individual recesses, arranged evenly or unevenly around the circumference of the end face 111 at each of the first and second ends 108, 110 of the connector body 102.

As illustrated in FIGS. 2 and 3, the connector body 102 is configured such that the first recess 150 is located adjacent the outer surface of the pipe 106 when said pipe 106 is inserted into the open end 112 of the connector body 102. As shown in FIG. 3, when the mechanical interlock arrangement 104 is in the secured condition this allows the interconnection between the first end 126 of the first ring 116 and the first recess 150 to be located adjacent the outer surface of the pipe 106. Such a configuration ensures that the concentricity of the first ring 116, the second ring 118, the connector body 102 and each inserted pipe 106 is maintained. This is particularly important for maintaining the integrity of the metal-to-metal seal once the seal assembly is operational and conveying fluid between two pipes.

When the mechanical interlock arrangement 104 is secured with respect to the connector body 102 (i.e. in the secured condition), the interconnection between the first ring 116 of the adaptor 115 and the connector body 102 may act as a pivot point when externally acting forces, such as bending moments, act on a connected pipe 106. It has been found that by minimising the radial distance of this point from the pipe 106 can greatly reduce the impact of said external forces on the integrity of the metal-to-metal seal between the free end of the pipe and the connector body. As a result, the likelihood of fluid leakage is greatly reduced.

In the described embodiment, the seal assembly 100 further includes a locating arrangement 156 for ensuring the alignment of the adaptor 115 with respect to the connector body 102, as the second ring 118 is moved in the direction towards the connector body 102. The locating arrangement 156 includes an end face at the first and second ends 108, 110 of the connector body 102 having a second recess 158, and an end face of at first end 134 of the second ring 118 having a plurality of projections 160 configured to be received within the recess 158 during movement of the second ring 118 in the direction towards the connector body 102.

The locating arrangement 156 further ensures that the concentricity of the first ring 116, the second ring 118, the connector body 102 and each inserted pipe 106 is maintained by securing the position of the second ring 118 relative to the connector body 102 when the mechanical interlock arrangement is in the secured condition, as illustrated in FIG. 3. Advantageously, this further ensures that reliable metal-to-metal seal is maintained between the connector body 102 and each inserted pipe 106 even when each pipe 106 may be subject to externally acting forces, such as a bending moment.

In the described embodiment, the second recess 158 extends continuously around the circumference of the end face 111 of each of the first and second ends 108, 110 of the connector body 102. The second recess 158 is concentric with the first recess 150. In alternative embodiments, the second recess 158 may comprise a plurality of individual recesses, arranged evenly or unevenly around the circumference of the end face 111 of each of the first and second ends 108, 110 of the connector body 102.

In the described embodiment, the projections 160 of the locating arrangement 156 comprise a series of castellations. The projections 160 extend laterally from the first end 134 of the second ring 118, and are distributed at evenly spaced intervals around the first end 134 of the second ring 118. Advantageously, distributing the projections 160 at regular intervals around the circumference of the first end 134 of the second ring 118 ensures that should an external force, such as a bending moment, act on a pipe 106 inserted into the connector body 102, the load is more evenly distributed around the interface between the second ring 118 and the connector body 102. The even distribution of said force therefore greatly reduces the likelihood that the concentricity of the first ring 116, the second ring 118, the connector body 102 and each inserted pipe 106 relative to one another will be lost, and as such, greatly reduces any negative impact on the integrity of the metal-to-metal seal between the connector body 102 and the free end of each pipe 114.

In the described embodiment the castellations 160 are arcuate. It has been found that by providing arcuate castellations, such a configuration further distributes said externally acting force more evenly across each projection 160. Advantageously, the likelihood that any one projection 160 may fail and break away from the second ring 118 under the action of such a force, is greatly reduced.

In alternative embodiments the projections 160 of the locating arrangement 156 may be non-arcuate castellations, and in addition, may not be castellated. Furthermore, the projections may instead be a single continuous projection extending continuously around the circumference of the end face 111 of each of the first and second ends 108, 110 of the connector body 102.

Referring again to FIG. 3, the mechanical interlock arrangement 104 further includes a fastening arrangement 162. The fastening arrangement 162 is configured such that fastening of the fastening arrangement 162 acts to pull the connector body 102 in the direction of the adaptor 115 (i.e. towards the secured position), and at the same time, move the second ring 118 in the direction towards the connector body 102. When the second ring 118 is moved in the direction of the connector body 102 whilst being in contact with the first ring 116, the pipe 106 is driven into the connector body 102 allowing the free end 114 of the pipe 106 to be driven into contact with the side wall 146 of the bore 144. More specifically, the outer surface 148 of the free end 114 of the pipe 106 is driven into contact with the side wall 146 of the bore 144. As a result, a metal-to-metal seal is created between the free end 114 of the pipe 106 and the connector body 102.

The fastening arrangement 162 includes the second ring 118 having a plurality of fasteners 164, and the connector body 102 having a plurality of fastening points 166 configured to receive said fasteners 164. By providing the second ring 118 with a plurality of fasteners 164, and the connector body 102 with a plurality of fastening points 166 configured to receive said fasteners 164, the second ring 118 can be advantageously quickly and easily attached to the connector body 102 upon the mechanical interlock arrangement 104 having been moved fully in the direction of the connector body 102, such that a metal-to-metal seal exists between the connector body 102 and the free end 114 of an inserted pipe 106. In addition, the second ring 118 can be quickly and easily detached from the connector body 102 by virtue of said attachment being releasable, should an operator wish to remove the seal assembly 100.

In the described embodiment the fasteners 164 are threaded bolts. The bolts 164 are arranged such that they penetrate apertures 168 formed in the second ring 118, said apertures extending between the first and second ends 134, 136 of the second ring 118. The bolts 164 are arranged such that the head portion is located adjacent the second end 136 of the second ring, with the threaded shaft penetrating the aperture 168 between the second 136 and first ends 134. In the described embodiment, the fastening points 166 are threaded recesses having a thread configured to correspond to that of the fasteners 164, and are provided in the first and second ends 108, 110 of the connector body 102. More specifically, the threaded recesses 166 are located in a base wall 170 of the second recess 158. In the described embodiment, the fastening points 166 are arranged at evenly spaced intervals around the base wall 170 of the second recess 158, at positions that correspond to those of the apertures 168, and as such the fasteners 164, which are arranged at evenly spaced intervals around the circumference of the second ring 118.

Advantageously, distributing the fasteners 164 at regular intervals around the circumference of the second ring 118 ensures that should an external force, such as a bending moment, act on a pipe 106 inserted into the connector body 102, the load is more evenly distributed around the interface between the second ring 118 and the connector body 102. The even distribution of said force therefore greatly reduces the likelihood that the second ring 118 may become detached from the connector body 102, or that the concentricity of the first ring 116, the second ring 118, the connector body 102 and each inserted pipe 106 relative to one another will be detrimentally affected. Such a configuration therefore greatly reduces any negative impact of such an external force on the integrity of the metal-to-metal seal between the connector body 102 and the free end 114 of each pipe 106.

Upon complete fastening of the fastening arrangement 162, the second ring 118 is releasably attached to the connector body 102, with the mechanical interlock arrangement 104 fully secured in the secured condition. Advantageously, the metal-to-metal seal between the free end 114 of the pipe 106 and the connector body 102 can be securely and reliably maintained once created, with relative movement between each connected pipe 106 and the connector body 102 minimised.

As illustrated best by FIG. 1, each aperture 168, and as such fastener 164, is located such that the position alternates with the position of each projection 160 of the locating arrangement 156. Advantageously, distributing the fasteners 164 and projections 160 at regular, alternating intervals around the circumference of the second ring 118 maximises the stability of the interface between the second ring 118 and the connector body 102, and optimises the distribution of load should an external force, such as a bending moment, act on a pipe 106 inserted into the connector body 102.

Throughout the description and claims of this specification, the words "comprise" and "contain" and variations of the word, for example "comprising" and "comprises", means "including, but not limited to", and it is not intended to (and does not) exclude other moieties, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or compounds described in conjunction with a particular aspect, embodiment or example of the invention are to be understood as be applicable to any other aspect, embodiment or example described herein unless incompatible therewith.

The invention claimed is:

1. A seal assembly, comprising:
a connector body with an open end leading to an annular seal surface, configured for contact with a free end of a pipe received in the open end, wherein the connector body has a longitudinal axis, and the annular seal surface extends at an angle to, and tapers along, the longitudinal axis;
an adaptor for securing at the free end of the pipe; and
a mechanical interlock arrangement configured for coupling the adapter with the connector body, and driving the adaptor in the direction of the connector body, when the adaptor is secured at the free end of a pipe, for driving the free end of the pipe substantially along the longitudinal axis and into sealing contact with the annular seal surface;
optionally, wherein the annular seal surface is a metal seal surface.

2. A seal assembly according to claim 1, wherein the mechanical interlock arrangement is configured for preventing or limiting axial movement of the pipe relative to the connector body, when the adaptor is secured to an outer surface of the pipe and when the free end of the pipe is in sealing contact with the annular seal surface.

3. A seal assembly according to claim 1, wherein the adaptor comprises a first ring, configured to be mounted around a circumference of the free end of a pipe, and a second ring configured to cooperate with the first ring in order to drive the first ring into engagement with an outer surface of the pipe.

4. A seal assembly according to claim 3, wherein the first ring has an angled outer surface defining a first taper, and the second ring has an angled inner surface defining a second taper complimentary to said first taper, and configured so that contact forces acting therebetween increase upon axial movement of the second ring relative to the first ring in the direction towards the connector body, for driving the first ring in a radial direction into contact with the outer surface of the pipe; optionally wherein the first ring has a first end, a second end and a central longitudinal axis, and wherein the angled outer surface extends between the first and second ends at an angle of between 5 and 15° with respect to the central longitudinal axis; optionally, wherein the angled outer surface extends at an angle of substantially 8° to the central longitudinal axis.

5. A seal assembly according to claim 3, wherein the first ring comprises a first radial stop surface, arranged for abutment by the second ring, to limit movement of the second ring in the direction towards the connector body.

6. A seal assembly according to claim 3, wherein the connector body includes a first recess, and wherein a first end of the first ring is configured to nest within said recess when the second ring is driven in the direction of the connector body; optionally, wherein the first end of the first ring comprises a tapered outer surface configured to cooperate with a side wall of the first recess, to assist the passage of the first end of the first ring into the first recess.

7. A seal assembly according to claim 6, wherein the first recess is configured to be arranged adjacent the outer surface of the pipe, when said pipe is inserted into the open end of the connector body.

8. A seal assembly according to claim 6, wherein an innermost wall of the first recess defines a radial stop surface arranged to engage a second radial stop surface provided on the first end of the first ring, and wherein abutment of the second radial stop surface with the innermost wall of the first recess prevents further movement of the adaptor in the direction towards the connector body.

9. A seal assembly according to claim 3, wherein an inner surface of the first ring is non-planar, and is configured to securely engage with the outer surface of the pipe; optionally wherein the non-planar profile of the inner surface of the first ring is configured to engage the outer surface of the pipe by virtue of an interference fit; and/or optionally wherein the first ring includes a keying surface configured for purchase into the outer surface of the pipe; or optionally wherein the inner surface of the first ring comprises a profile configured to complement a non-planar profile of the outer surface of the pipe.

10. A seal assembly according to claim 9, wherein the inner surface of the first ring comprises a plurality of projections, configured to be received in a series of recesses on the outer surface of a pipe; optionally, wherein the plurality of projections comprise teeth or barbs.

11. A seal assembly according to claim 1, wherein the seal assembly further comprises a locating arrangement for ensuring a desired alignment of the mechanical interlock arrangement with the connector body, as the adaptor is moved in the direction towards the connector body.

12. A seal assembly according to claim 11, wherein the locating arrangement comprises an end face of the connector body having a second recess, and an end face of the adaptor having a projection configured to be received within said recess during movement of the adaptor in the direction towards the connector body.

13. A seal assembly according to claim 11, wherein the locating arrangement comprises an end face of the connector body having a plurality of recesses, and an end face of the adaptor having a plurality of projections configured to be received within said recesses; optionally wherein the projections comprise a series of castellations, wherein said castellations project at regular intervals around the circumference of the adaptor; optionally, wherein said castellations are of arcuate form.

14. A seal assembly according to claim 1, wherein the mechanical interlock arrangement comprises a fastening arrangement for pulling the connector body in the direction of the mechanical interlock arrangement, in order to drive the free end of the pipe into sealing engagement with the annular seal surface.

15. A seal assembly according to claim 14, wherein the fastening arrangement comprises the adaptor having a plurality of fasteners, and the connector body having a plurality of fastening points, and wherein the fastening arrangement is configured to releasably attach the adaptor to the connector body; optionally wherein the adaptor has a plurality of apertures extending therethrough, and wherein the fasteners are configured to be inserted through said apertures in the direction towards the connector body; and/or optionally wherein the fasteners are arranged at regular intervals around the circumference of the adaptor, and wherein the fastening points are located at regular intervals around the end face of the connector body, and wherein the position of each fastener is complementary to the position of each fastening point; and/or optionally wherein the fastening points comprise a plurality of recesses, configured to align with the fasteners and to releasably attach to said fasteners during movement of the adaptor in the direction towards the connector body.

16. A seal assembly according to claim 1, wherein the connector body comprises a second open end leading to a second annular seal surface, configured for cooperation with a free end of a respective pipe;
    wherein the seal assembly further comprises;
    a second adaptor configured for securing at the free end of the respective pipe; and
    a second mechanical interlock arrangement configured for coupling the second adapter with the connector body, and driving said second adaptor in the direction of the connector body, when the second adapter is secured at the free end of the respective pipe; optionally, wherein the second annular seal surface extends at an angle to the longitudinal axis; and/or optionally, wherein the second mechanical interlock arrangement is further configured for preventing or limiting axial movement of the respective pipe relative to the connector body.

17. A seal assembly, comprising:
    a connector body with an open end leading to an annular seal surface, configured for contact with a free end of a pipe received in the open end, wherein the connector body has a longitudinal axis, and the annular seal surface extends at an angle to, and tapers along, the longitudinal axis;
    an adaptor for securing at the free end of the pipe; and
    a mechanical interlock arrangement configured for coupling the adapter with the connector body, and driving the adaptor in the direction of the connector body, when the adaptor is secured at the free end of a pipe, for driving the free end of the pipe substantially along the longitudinal axis and into sealing contact with the annular seal surface,
    wherein the annular seal surface extends away from the open end of the connector body at an angle of less than 10° with respect to the longitudinal axis.

18. A seal assembly according to claim 17, wherein the annular seal surface extends away from the open end of the connector body at an angle substantially 4° with respect to the longitudinal axis.

19. A method of creating a metal-to-metal seal between a free end of a pipe and a connector body, the method comprising the steps of:
    providing a connector body with an open end leading to a metal annular seal surface, the connector body having a longitudinal axis, and the metal annular seal surface extending at an angle to the longitudinal axis;
    securing an adapter at a free end of a pipe;
    coupling the adapter with the connector body via a mechanical interlock arrangement; and
    driving the adapter in the direction of the connector body via the mechanical interlock arrangement, such that the free end of the pipe is driven into sealing engagement with the metal annular seal surface, to provide a metal-to-metal seal between said free end of the pipe and said metal annular seal surface.

* * * * *